United States Patent
Szuromi et al.

(10) Patent No.: US 11,306,173 B2
(45) Date of Patent: Apr. 19, 2022

(54) SEMI-CRYSTALLINE THERMOPLASTIC BLOCK COPOLYMERS

(71) Applicant: Dow Global Technologies LLC, Midland, MI (US)

(72) Inventors: Endre Szuromi, Freeport, TX (US); Justin M. Virgill, Oakland, CA (US); Robert F. Wendel, Freeport, TX (US); Jeffrey C. Munro, Freeport, TX (US); Gary R. Marchand, Freeport, TX (US); Edmund M. Carnahan, Freeport, TX (US); Kim L. Walton

(73) Assignee: Dow Global Technologies LLC, Midland, MI (US)

( * ) Notice: Subject to any disclaimer, the term of this patent is extended or adjusted under 35 U.S.C. 154(b) by 452 days.

(21) Appl. No.: 16/321,567

(22) PCT Filed: Jul. 19, 2017

(86) PCT No.: PCT/US2017/042732
§ 371 (c)(1),
(2) Date: Jan. 29, 2019

(87) PCT Pub. No.: WO2018/022366
PCT Pub. Date: Feb. 1, 2018

(65) Prior Publication Data
US 2021/0277166 A1 Sep. 9, 2021

Related U.S. Application Data

(60) Provisional application No. 62/368,259, filed on Jul. 29, 2016.

(51) Int. Cl.
*C08F 297/08* (2006.01)

(52) U.S. Cl.
CPC .................. *C08F 297/086* (2013.01)

(58) Field of Classification Search
CPC ...... C08L 53/00; C08L 293/00; C08F 297/08; C08F 4/659
See application file for complete search history.

(56) References Cited

U.S. PATENT DOCUMENTS

| 7,858,706 | B2 | 12/2010 | Arriola et al. | |
|---|---|---|---|---|
| 7,893,166 | B2 | 2/2011 | Shan et al. | |
| 2008/0319116 | A1* | 12/2008 | Fredrickson | C08L 51/06 524/424 |
| 2010/0063213 | A1* | 3/2010 | Fredrickson | C08L 23/10 525/240 |
| 2011/0054121 | A1* | 3/2011 | Marchand | C08F 297/08 525/89 |

FOREIGN PATENT DOCUMENTS

| JP | H05280735 A | 10/1993 |
|---|---|---|
| JP | H05320468 A | 12/1993 |
| JP | 2007-131749 A | 5/2007 |

OTHER PUBLICATIONS

Chung Ho Lee, Polymer Preprints, 2003, 44(2), 825-826.
Translation of JP2007131749A.

* cited by examiner

*Primary Examiner* — Robert D Harlan
(74) *Attorney, Agent, or Firm* — Quarles & Brady LLP

(57) ABSTRACT

Semi-crystalline, thermoplastic polyolefin block copolymers comprising: (A) A first polyolefin A block comprising isotactic poly(1-butene) (iPB); (B) A polyolefin B block comprising an ethylene and/or alpha-olefin/1-butene copolymer or terpolymer; and (C) A second polyolefin A block comprising isotactic poly(1-butene) (iPB); the A and B blocks bonded to one another to form a block copolymer in which the first and second polyolefin A blocks are joined to and separated by the polyolefin B block. In one embodiment the polyolefin block copolymer is a BAB block copolymer.

16 Claims, 1 Drawing Sheet

SEMI-CRYSTALLINE THERMOPLASTIC BLOCK COPOLYMERS

FIELD OF THE INVENTION

This invention relates to thermoplastic block copolymers, to compositions comprising such copolymers, and to a process for making such copolymers.

BACKGROUND OF THE INVENTION

US 2010/0063213 A1 describes gel fiber and film compositions comprised of narrow molecular weight distribution homopolymers, statistical copolymers, block copolymers, and graft copolymers blended with a low molecular weight diluent. However, a need stills exists for polyolefin elastomers with better elastic hysteresis.

SUMMARY OF THE INVENTION

In one embodiment the invention is a semi-crystalline thermoplastic polyolefin block copolymer that combines high tensile strength with other desirable physical properties, such as high elongation at break and/or high elastic recovery. Within the semi-crystalline copolymer, crystalline domains are comprised of isotactic poly(1-butene) (iPB), the A or hard block, while the amorphous or semi-crystalline segment, the B or soft block, is comprised of a copolymer of 1-butene and ethylene or a second alpha-olefin or a terpolymer of 1-butene, ethylene, and a second alpha-olefin. In one embodiment, two A blocks are joined to and separated from one another by the B block, i.e., an ABA block terpolymer or higher order polymer such as an ABAB tetrablock copolymer or ABABA pentablock copolymer. In one embodiment, two B blocks are joined to and separated from one another by the A block, i.e., an BAB block terpolymer or higher order polymer such as an BABA tetrablock copolymer or BABAB pentablock copolymer. The desirable properties of the resulting segmented copolymer are superior to those obtained from blends of the individual blocks.

In one embodiment the invention is a semi-crystalline, thermoplastic polyolefin block copolymer comprising:
 (A) A first polyolefin A block comprising isotactic poly (1-butene) (iPB);
 (B) A polyolefin B block comprising an ethylene and/or alpha-olefin/1-butene copolymer or terpolymer; and
 (C) A second polyolefin A block comprising isotactic poly(1-butene) (iPB);
the A and B blocks bonded to one another to form the polymer in which the first and second polyolefin A blocks are joined to and separated by the polyolefin B block.

In one embodiment the invention is a semi-crystalline, thermoplastic polyolefin block copolymer comprising:
 (A) A first polyolefin B block comprising an ethylene and/or alpha-olefin/1-butene copolymer or terpolymer;
 (B) A polyolefin A block comprising isotactic poly(1-butene) (iPB); and
 (C) A second polyolefin B block comprising an ethylene and/or alpha-olefin/1-butene copolymer or terpolymer;
the B and A blocks bonded to one another to form the polymer in which the first and second polyolefin B blocks are joined to and separated by the polyolefin A block.

In one embodiment the invention is a composition comprising a semi-crystalline, thermoplastic polyolefin block copolymer comprising a minimum block sequence of either ABA or BAB.

In one embodiment the invention is a process for making a semi-crystalline, thermoplastic polyolefin ABA block copolymer, the process comprising the steps of:
 (A) Feeding 1-butene to a high pressure reactor under polymerization conditions to produce a first A block of isotactic poly(1-butene) (iPB);
 (B) Adding ethylene and/or a second alpha-olefin to the reactor under copolymerization conditions to form a B block of a 1-butene/ethylene copolymer, a 1-butene/alpha-olefin copolymer, or a 1-butene/ethylene/alpha-olefin terpolymer which is attached to the first A block to form an AB block copolymer; and
 (C) Stopping the addition of ethylene and/or the second alpha-olefin, and continue feeding 1-butene to the reactor under polymerization conditions to form a second A block of iPB which is attached to the B block to form the ABA block copolymer.

In one embodiment the invention is a process for making the semi-crystalline, thermoplastic polyolefin BAB block copolymer, the process comprising the steps of:
 (A) Feeding 1-butene and ethylene and/or a second alpha-olefin to a reactor under copolymerization conditions to form a first B block of a 1-butene/ethylene copolymer, a 1-butene/alpha-olefin copolymer, or a 1-butene/ethylene/alpha-olefin terpolymer;
 (B) Stopping the addition of ethylene and/or the second alpha-olefin, and continue feeding 1-butene to the reactor under polymerization conditions to form an A block of isotactic poly(1-butene) (iPB) which is attached to the B block to form a BA block copolymer; and
 (C) Restarting the addition of ethylene and/or the second alpha-olefin to the reactor under copolymerization conditions to form a second B block of a 1-butene/ethylene copolymer, a 1-butene/alpha-olefin copolymer, or a 1-butene/ethylene/alpha-olefin terpolymer which is attached to the A block to form the BAB block copolymer.

DETAILED DESCRIPTION OF THE PREFERRED EMBODIMENT

Definitions

Figure 1:
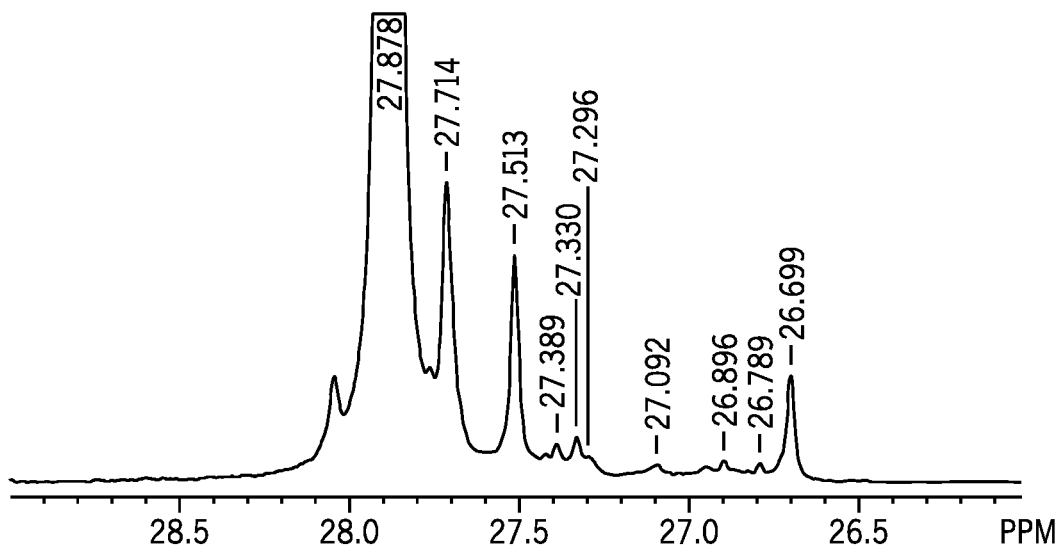
FIG. 1 is an example $^{13}$C NMR spectrum of the branch $CH_2$ region of a predominately isotactic poly(1-butene). This spectrum was acquired with 2560 scans to enable low level triads to be clearly observed for method development. This is 8× the number of scans used for the analysis of typical samples in the examples.
Figure 2:
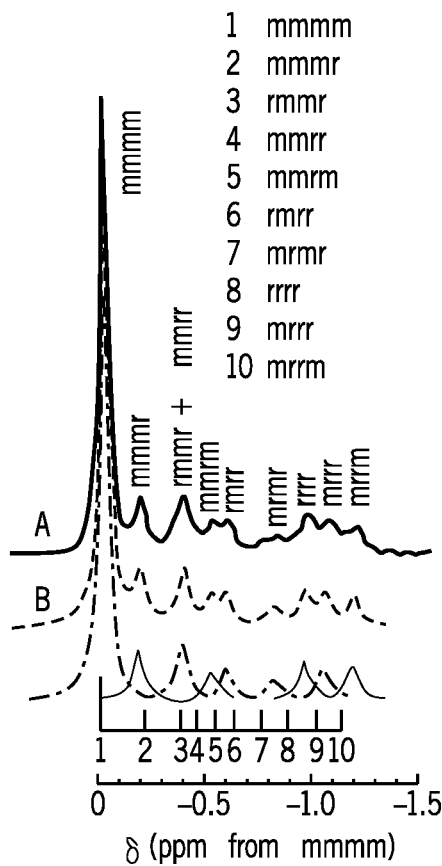
FIG. 2 is an example $^{13}$C NMR spectrum of the branch $CH_2$ region of a predominately isotactic poly(1-butene) (adapted from Tetsuo, A.; Demura, M.; Yamamoto, K.; Chûjô, R. "Polymerization Mechanism and Conformation of Poly(1-butene)," *Polymer* 1987, 28, 1037-1040).

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

"Polymerization conditions", "copolymerization conditions", and like terms refer to process parameters under which a procatalyst entering the reactor zone will be activated using a suitable activator, which results in an open coordination site on the metal center, thereby initiating the coordination polymerization or copolymerization. These conditions include, for example, pressure, temperature, concentrations of reagents and polymer, residence time and distribution, influencing the composition, molecular weight, molecular weight distribution (also known as polydispersity index, PDI) and polymer structure.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, the term copolymer, usually employed to refer to polymers prepared from at least two types of monomers, and the term terpolymer, usually employed to refer to polymers prepared from three different types of monomers. It also embraces all forms of copolymer, e.g., random, block, etc.

"Block copolymer", "block polymer" and like terms mean a polymer in which units derived from like monomers group together in a polymer chain, e.g., units derived from monomers A and B group together to form a polymer with a configuration of AAAABBBB, or ABA, or BAB, etc. Each block of a block copolymer can comprise mer units derived from a single monomer, e.g., ethylene, or 1-butene, etc., or the block can comprise mer units derived from two or more monomers, e.g., 1-butene and ethylene, or 1-butene and 1-hexene and/or 1-octene.

Hard (Crystalline) Block A

Block A is isotactic poly(1-butene) (iPB), and it has an isotacticity of meso triad percent (mm %) greater than (>) 90%. The melting temperature (Tm) of the A block can vary, but typically it is from 60 to 120° C., or from 70 to 110° C., or from 75 to 100° C. The melting enthalpy ($\Delta H_m$) of the A block can vary, but typically it is from 5 to 120 J/g, or from 8 to 90 J/g, or from 10 to 40 J/g, as measured after 1 week of aging at room temperature (23° C.). The weight average molecular weight ($M_w$) of the A block can vary widely, but typically it is from 8,000 to 90,000 grams per mole (g/mol), or from 15,000 to 70,000 g/mol, or from 25,000 to 60,000 g/mol. The number average molecular weight ($M_n$) of the A block can also vary widely, but typically it is from 5,000 to 50,000 grams per mole (g/mol), or from 8,000 to 40,000 g/mol, or from 10,000 to 30,000 g/mol. The polydispersity index (PDI, or $M_w/M_n$) of the A block can also vary widely, but typically it is from 1 to 3, or from 1.1 to 2, or from 1.3 to 1.8. In one embodiment the semi-crystalline, thermoplastic polyolefin block copolymers of this invention have at least two A blocks separated by and joined to a B block, and each A block can be the same or different in molecular weight and/or PDI. In one embodiment the semi-crystalline, thermoplastic polyolefin block copolymers of this invention have only one A block separating two B blocks.

Soft (Amorphous or Semi-Crystalline) Block B

Block B comprises a copolymer or terpolymer of 1-butene and one or more of ethylene and/or one or more of a second alpha-olefin. The second alpha-olefin typically has 3 to 12 carbon atoms, more typically 3 to 10 carbon atoms and even more typically 3 to 8 carbon atoms. Representative second alpha-olefins include propylene, 1-pentene, 1-hexene and 1-octene. In one embodiment the B block consists of 1-butene and ethylene. In one embodiment the B block consists of 1-butene and ethylene with the following properties: amorphous—a glass transition temperature ($T_g$) less than 0° C., preferably less than –20° C., and more preferably less than –40° C.; semi-crystalline—less than (<) 25% ethylene crystallinity ($T_m$<80° C.), preferably <20% ethylene crystallinity ($T_m$<70° C.), and more preferably <15% ethylene crystallinity ($T_m$<50° C.). In one embodiment the B block consists of 1-butene and a second alpha-olefin. In one embodiment, the B block consists of 1-butene, ethylene, and a second alpha-olefin.

The amount of 1-butene in the B block can vary widely, but typically the B block comprises from 15 to 90 weight percent (wt %), more typically from 30 to 80 wt %, and even more typically from 40 to 65 wt %, 1-butene.

The weight average molecular weight ($M_w$) of the B block can vary widely, but typically it is from 20,000 to 300,000 g/mol, or from 30,000 to 200,000 g/mol, or from 65,000 to 120,000 g/mol. The number average molecular weight ($M_n$) of the B block can also vary widely, but typically it is from 10,000 to 250,000 grams per mole (g/mol), or from 20,000 to 150,000 g/mol, or from 40,000 to 75,000 g/mol. The PDI of the B block can also vary widely, but typically it is from 1 to 3, or from 1 to 2, or from 1 to 1.5.

The butene crystallinity of the B block is always less than the butene crystallinity of the A block. In one embodiment the B block is amorphous with a glass transition temperature ($T_g$) of less than –20° C., and more typically less than –40° C.

In one embodiment the semi-crystalline, thermoplastic polyolefin block copolymers of this invention contain at least one B block that is joined to and separates two A blocks. In one embodiment the semi-crystalline, thermoplastic polyolefin block copolymers of this invention have at least two B blocks separated by and joined to an A block, and each B block can be the same or different in molecular weight and/or PDI. In one embodiment, the semi-crystalline, thermoplastic polyolefin block copolymers of this invention contain two or more B blocks, with the B blocks alternating with the A blocks to form a block polymer with an ABAB or BABA configuration. Each B block can be the same or different in molecular weight and/or PDI.

Semi-crystalline, Thermoplastic Polyolefin Block Copolymers

The polyolefin block copolymers of this invention comprise an ABA or BAB block structure. In one embodiment the block copolymer is a terpolymer with an ABA block structure. In one embodiment the block copolymer is a terpolymer with an BAB block structure. In one embodiment the block copolymer is a tetrablock copolymer with an ABAB or BABA block structure. In one embodiment the block copolymer is a pentablock copolymer with an ABABA or BABAB block structure.

The weight average molecular weight ($M_w$) of the block copolymer of this invention can vary widely, but typically it is from 40,000 to 500,000 g/mol, or from 50,000 to 350,000 g/mol, or from 100,000 to 250,000 g/mol. The number average molecular weight (Mn) of the block copolymer can also vary widely, but typically it is from 20,000 to 350,000 grams per mole (g/mol), or from 30,000 to 250,000 g/mol, or from 70,000 to 160,000 g/mol. The PDI of the block copolymer can also vary widely, but typically it is from 1 to 3, or from 1 to 2, or from 1.3 to 2.

The relative amount of A block to B block in the block copolymers of this invention can vary widely but typically the weight ratio of the A blocks to B block(s) is from 4:96 to 70:30, or from 15:85 to 60:40, or from 30:70 to 45:55, based on the weight of the block copolymer.

Process for Making Polyolefin Block Copolymers

In one embodiment, an ABA block terpolymer is made in a three-step process in which the first step comprises feeding 1-butene to a high pressure reactor under polymerization conditions to produce the first A block (iPB) at a desired $M_w$, $M_n$ and/or PDI. The second step comprises adding ethylene and/or a second alpha-olefin to the reactor (with 1-butene still present in the reactor and/or with additional 1-butene fed to the reactor) under copolymerization conditions to grow the B block through chain extension from the active end of the first A block. The third step comprises stopping the addition of ethylene and/or second alpha-olefin feed to the reactor, and, if necessary, purging the reactor of unreacted ethylene and/or second alpha-olefin, but continuing the feed of 1-butene under polymerization conditions to grow the second A block from the active end of the B block. The final block polymer is recovered using conventional equipment and protocols. The process for producing a BAB block copolymer is essentially the same except that the first B block is first made, followed by the making of the A block, followed by the making of the second block, i.e., mutatis mutandis.

The inventive copolymers can be produced via solution living polymerization at low temperature (<0° C.) using a suitable catalyst (e.g., a metallocene, salen-type, etc.), that can produce iPB (A block) with high tacticity (mm %>90%, preferably >96%) and ethylene or a second alpha olefin/1-butene copolymer or terpolymer (B block) in a living manner in a Parr reactor, continuous stirred tank reactor (CSTR) or loop reactor. This is the method illustrated in the examples.

Alternatively, the block copolymers of this invention can be produced in a high temperature solution process (>120° C.) using a combination of two catalysts and a chain shuttling agent. Both catalysts are capable of chain shuttling, and one produces iPB (A block) and the other produces the B block. The A and B blocks are produced in separate reactors. For triblocks, a series of 3 reactors can be used (Parr reactors, CSTR or loop reactors).

Another potential method using high temperature solution polymerization involves the synthesis of iPB with high isotacticity and high chain-end unsaturation using a suitable catalyst (e.g., CGC catalysts) followed by a series of steps to functionalize the double bonds (e.g., install amine functional groups) and couple the resulting polymer with a suitable functionalized soft copolymer (e.g., maleic anhydride-grafted ethylene-octene (EO) copolymer).

Applications

The thermoplastic polyolefin block copolymers of this invention may be used neat or as a formulated blend in injected molded parts, cast or blown films. The desirable properties of the resulting segmented copolymers are superior to those obtained from blends of the individual blocks. Representative end uses include, but are not limited to, airbeds, medical cushions, artificial leather (sporting bags, upholstery), cap liners, medical and other tubing, grips, lids, toys, tooth brushes, elastic film (diapers, etc.) and the like. Additional uses are identified in U.S. Pat. Nos. 7,858,706 and 7,893,166.

SPECIFIC EMBODIMENTS

Test Methods

Gel Permeation Chromatography (GPC)

A high temperature Triple Detector Gel Permeation Chromatography (3D-GPC) system equipped with Robotic Assistant Delivery (RAD) system for sample preparation and sample injection was used. The concentration detector was an infrared concentration detector (IR4 from Polymer Char Inc., Valencia, Spain). The other two detectors were 1) a Precision Detectors 2-angle laser light scattering detector, Model 2040, from Agilent, and 2) a 4-capillary differential viscometer detector, Model 150R, from Viscotek (Houston, Tex.). The 15-degree angle of the light scattering detector was used for absolute molecular weight calculation purposes.

Data collection was performed using the Polymer Char DM 100 Data acquisition box. The chromatographic and the sample preparation solvent was 1,2,4-trichlorobenzene (TCB) containing 200 ppm of butylated hydroxytoluene (BHT). TCB was sparged with nitrogen. The columns were four Olexis 13 micron columns or four Mixed A LS 20 um columns. The injection volume was 200 µl, and the flow rate was 1.0 mL/minute. The column compartment was operated at 150° C. Solid samples were made at a concentration 1-2 mg/mL in TCB, and solution samples were diluted with TCB targeting 1-2 mg/mL. All samples were filtered hot through a layer of Perlite to remove color and/or catalyst residues prior to running HT GPC.

Calibration of the GPC column set was performed with 21 narrow molecular weight distribution polystyrene standards, with molecular weights ranging from 580 to 8,400,000 g/mol. The polystyrene standard peak molecular weights were converted to polyethylene molecular weights using the following equation (Williams, T. and Ward, I. M. "The Construction of a Polyethylene Calibration Curve for Gel Permeation Chromatography Using Polystyrene Fractions" *J. Polym. Sci., Polym. Let.* 1968, 6, 621):

$$M_{pe} = A(M_{ps})^B \tag{Eq. 1}$$

where B=1.0, and the experimentally determined value of A is approximately 0.38.

A fifth-order polynomial was used to fit the respective polyethylene-equivalent calibration points obtained from Eq. 1 to their observed elution volumes for each polystyrene standard. Number average and weight average molecular weights ($M_n$ and $M_w$ respectively) were calculated according to the following equations:

$$Mn = \frac{\sum_i Wf_i}{\sum_i (Wf_i / M_i)} \tag{Eq. 2}$$

$$Mw = \frac{\sum_i (Wf_i * M_i)}{\sum_i Wf_i} \tag{Eq. 3}$$

Where $Wf_i$ and $M_i$ are the weight fraction and molecular weight of elution component i, respectively. The accurate A value was determined by adjusting its value in Eq 1 until the $M_w$, of a linear PE homopolymer reference (Dow 53494-38-4) calculated using Eq 3 agreed with its known $M_w$ of 115,000 g/mol. The polydispersity index (PDI) was expressed as $M_w/M_n$. Conventional GPC results were determined by this method.

The absolute molecular weights were determined by the LS and IR4 concentration detectors using the following equation:

$$Mw(\text{abs}) = K_{LS} * \frac{\sum (LS_i)}{\sum (IR_i)} \quad \text{(Eq. 4)}$$

where $\Sigma(LS_i)$ is the response area of LS detector, $\Sigma(IR_i)$ is the response area of the IR4 detector, and $K_{LS}$ is the instrument constant, that was determined using a standard (NBS 1475) with known concentration and the certificated value for the weight average molecular weight (52,000 g/mol).

The composition detector (IR5) measures infrared response of carbon-hydrogen bond stretches of the methyl groups from the polymerized 1-butene comonomer, and the methylene/methine groups from both the polymerized ethylene and 1-butene comonomers. The ratio of the methyl and methylene infrared responses was used to determine the butene content at each elution volume. The IR5 detector composition mode was calibrated with modal poly(ethylene-co-1-butene) random copolymers with known 1-butene content determined by $^{13}$C NMR spectroscopy. The calibration curve was built by first order fitting of the response ratio of methyl to methylene at the peak position to the weight percentage of 1-butene for each sample.

The comonomer wt % at each elution component of each characterized sample was calculated using the measured ratio of the methyl over methylene responses and the established calibration curve, while the molecular weight of the same elution component was calculated as discussed previously. The molecular weight and comonomer content at each elution component were plotted as two dimensional plots.

Carbon 13 Nuclear Magnetic Resonance ($^{13}$C NMR)

Sample Preparation

Samples were prepared by adding approximately 2.7 g of a 50/50 (by wt) mixture of tetrachloroethane-d$_2$/orthodichlorobenzene containing 0.025 M Cr(acac)$_3$ to 0.10 to 0.25 g of the polymer sample in the NMR tube. Each sample was dissolved and homogenized by heating the tube and its contents to approximately 145° C. using a heating block and heat gun. Each sample was visually inspected to ensure homogeneity.

Data Acquisition Parameters

The data were collected using a Bruker 400 MHz spectrometer equipped with a Bruker Dual DUL high-temperature CryoProbe. The data were acquired using 320 scans, a 6 sec pulse repetition delay (1.3 s at and 4.7 s D1), 90 degree flip angles, and inverse gated decoupling with a sample temperature of 120° C. All measurements were made on non-spinning samples in locked mode. Samples were allowed to thermally equilibrate for 7 minutes prior to data acquisition. The $^{13}$C NMR chemical shifts were internally referenced to the mmmm+mmmr CH$_3$'s at 11.0 ppm (for iPB homopolymer) or the EEE triads at 30.0 ppm (for EB and block polymers).

Data Analysis for Tacticity in iPB Homopolymers

Tacticity for iPB homopolymers was determined from the C2 branch CH$_2$ region of the $^{13}$C NMR spectrum (~26.5 to 28 ppm) as shown in Table 1 (Tetsuo, A.; Demura, M.; Yamamoto, K.; Chûjô R. "Polymerization Mechanism and Conformation of Poly(1-butene)," *Polymer* 1987, 28, 1037-1040). 1.0 Hz line broadening was applied prior to the Fourier transformation of the data. The integral for the entire branch CH$_2$ region from ~26.5 to 28 ppm was set to a value of 100 to establish nominal values. The following regions were then integrated: mmmm=27.8 to 28.3 ppm, mm=27.4 to 28.3 ppm.

TABLE 1

Integral regions and assignments used for tacticity determination in iPB homopolymers.* The chemical shifts are referenced to 11.0 ppm for the mm methyls.

| Peak # | Pentad | Triad | ppm | Δ ppm (ref.) approx. | Δ ppm (observed) |
|---|---|---|---|---|---|
| 1 | mmmm | mm | 27.878 | 0.00 | 0.000 |
| 2 | mmmr |  | 27.714 | 0.20 | −0.164 |
| 3 | rmmr |  | 27.513 | 0.40 | −0.365 |
| 4 | mmrr | mr | 27.389 | 0.46 | −0.489 |
| 5 | mmrm |  | 27.330 | 0.55 | −0.548 |
| 6 | rmrr |  | 27.296 | 0.65 | −0.582 |
| 7 | mrmr |  | 27.092 | 0.75 | −0.786 |
| 8 | rrrr | rr | 26.896 | 0.90 | −0.982 |
| 9 | mrrr |  | 26.789 | 1.02 | −1.089 |
| 10 | mrrm |  | 26.699 | 1.15 | −1.179 |

*Tetsuo, A.; Demura, M.; Yamamoto, K.; Chûjô. R. "Polymerization Mechanism and Conformation of Poly(1-butene)" *Polymer* 1987, 28, 1037-1040.

Data Analysis for Comonomer Content in the EB Block

The 1-butene content of EB random copolymers was determined using the simple method of setting the full polymer integral (~40 to 10 ppm) to a value of 1000, and integrating all butene methyls from ~12 to 10 ppm. The wt % and mol % 1-butene values were then calculated directly from these two integrals. This method is accurate for the typical EB compositions in these examples with near 50 mol % comonomer content. Other methods are more appropriate when the amount of either monomer is less than 5-10 mol %.

Data Analysis for Block Copolymers

The diblock, triblock and tetrablock copolymer spectra were analyzed using the method described above for overall wt % and mol % 1-butene. The amount of iPB present was determined using the integral of the mm branch CH$_2$'s at 27.9 ppm. This peak was fairly well resolved in most samples. Due to the high ethylene content of the EB component, the number of 1-butene sequences of three or more units, which are necessary to create an isotactic mm triad, was very small, and could be treated as zero. From these two integrals, and having set the full polymer integral to 1000, one can readily calculate the wt % EB, wt % iPB, and wt % B in the EB values.

Differential Scanning Calorimetry (DSC)

Glass transition temperature (T$_g$), melting enthalpy (ΔH$_m$), and melting temperature (T$_m$) were measured by DSC. Samples were analyzed using a TA Instruments Q2000 DSC approximately 1 week after the polymers were produced. Samples were cut from compression molded films. Approximately 5 mg of polymer was placed into an aluminum pan and capped with an aluminum lid. Samples were analyzed by cooling to −100° C. at 10° C./min, then heating to 180° C. at 10° C./min, cooling to −100° C. at 10° C./min, and heating to 180° C. at 10° C./min. The data was analyzed using TA Universal Analysis software. The T$_g$ was measured using the 1$^{st}$ heat cycle data using the inflection method. The melting enthalpy (ΔH$_m$) and melting temperature (Tm) was measured using the 1$^{st}$ heat cycle data.

Tensile measurements were measured on an INSTRON™ 4201 using ASTM D638 with Type V sample geometry with a 2"/min extension rate. All reported values represent the average of 2-3 sample bars and are reported in terms of engineering stress and strain unless otherwise noted. Samples were compression molded at approximately 150° C. and allowed to age at ambient conditions for approximately seven days prior to testing. Tensile hysteresis measurements were performed at 300% elongation with no relaxation period between loading/unloading cycles at a 2"/min rate using the same sample geometry. The percentage energy loss and tensile set observed during the first loading/unloading cycle was determined [{(area under the $1^{st}$ stress-strain extension curve)−(area under the $1^{st}$ stress-strain retraction curve)}/(area under the $1^{st}$ stress-strain extension curve)]. All reported values represent the average of 3 sample bars. Small delays in stress response (typically <10% strain) resulting from residual "slack" in the specimen after loading into the INSTRON™ sample holder and zeroing the load were compensated for in the reported tensile set values. Compression set was measured based on ASTM D395B. Due to limited sample quantities, the procedure was modified to utilize specimens of approximately 1"×0.25" (diameter×thickness), which were obtained by stacking four 1"×1/16" (diameter×thickness) samples. Specimens were compressed by 25% of their initial thickness at 23 and 70° C. for 24 hrs. All reported values were obtained from a single specimen. The tensile set was reported as the % strain at which the stress returned to a value of zero upon the $1^{st}$ retraction cycle.

Ultimate tensile strength was measured according to ASTM D638 (Type V).

Elongation at break was measured according to ASTM D638 (Type V).

Young's modulus was measured according to ASTM D638 (Type V).

Tensile strength at 100% was measured according to ASTM D638 (Type V).

Tensile strength at 300% was measured according to ASTM D638 (Type V).

Materials

Chlorobenzene (HPLC grade, 99.9%) and toluene were obtained from Aldrich, degassed by sparging with dry nitrogen and dried over molecular sieves and activated alumina beads prior to use. The activated alumina beads (F-200, 1/8" bead size, product of BASF) were obtained from Coastal Chemical and dried at 250° C. for several days, then stored under a dry nitrogen atmosphere prior to use. Methanol was purchased from Aldrich and used as received. Tris(pentafluorophenyl)boron (FAB), trityl tetrakis(pentafluoro-phenyl)borate and reagents for the synthesis of ligand 1 were obtained from commercial sources and used as received. Ligand 1 was synthesized according to the reported procedure (Cohen, A.; Kopilov, J.; Lamberti, M.; Venditto, V.; Kol, M. Macromolecules 2010, 43, 1689-1691).

Procatalyst 2 was prepared in situ by mixing ligand 1 and tetrabenzyltitanium shortly before each polymerization run. Procatalyst 3 used for the synthesis of the iPB sample used to prepare the polymer blends in the Comparative Examples was synthesized using the general synthetic method described in Kissounko, D. A.; Fettinger, J. C.; Sita, L. R. "Structure/Activity Relationships for the Living Ziegler-Natta Polymerization of 1-Hexene by the Series of Cationic Monocyclopentadienyl Zirconium Acetamidinate Complexes" Inorg. Chim. Acta 2003, 345, 121-129. The $^1$H NMR data for procatalyst 2 can be found in Jayaratne, K. C.; Sita, L. R. "Stereospecific Living Ziegler-Natta Polymerization of 1-Hexene" J. Am. Chem. Soc. 2000, 122, 958-959.

Air-sensitive compounds were manipulated in a glovebox under a dry nitrogen atmosphere and stored at −30° C. The monomers were obtained from Airgas (ethylene: 99.9%, 1-butene: 99.95%, 3.5 grade). The 1-butene monomer was passed through a purification bed containing molecular sieves and SELEXSORB™ CD (a smooth, spherical adsorbent customized to provide optimum adsorption for several polar organic compounds including: oxygenated hydrocarbons, mercaptans, and nitrogen-based molecules, available from BASF) both dried at 250° C. under nitrogen before use. Given the air- and moisture-sensitive nature of the catalyst, the dry solvent and reagents were fed into the polymerization reactor using pressurized nitrogen, and extra care was taken to avoid exposure of the reactor contents to oxygen and moisture at all times.

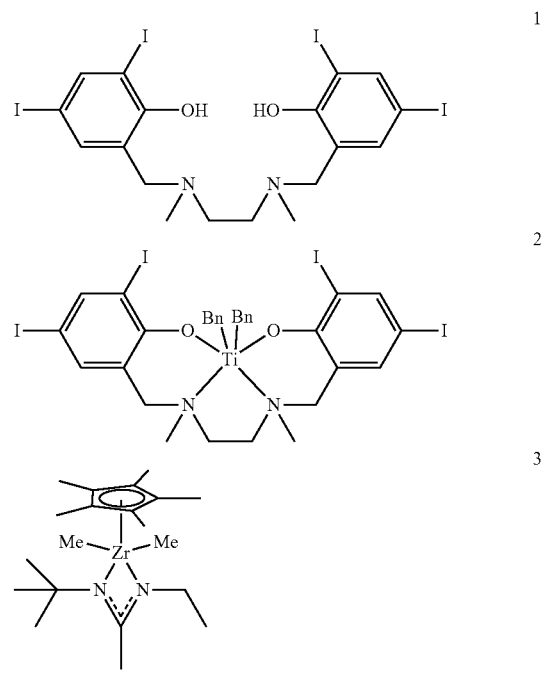

Synthesis of Tetrabenzyltitanium (TiBn$_4$)

In a nitrogen-filled drybox BnMgCl (120 mL, 91.2 mmol, 0.76 M in Et$_2$O) was cooled to −30° C. in an amber bottle. TiCl$_4$ (4.325 g, 22.8 mmol) was dissolved in 40 mL pentane and the solution was cooled to −30° C. The cold TiCl$_4$ solution was slowly added to the cold BnMgCl solution while stirring. Cold pentane (40 mL) was added and the deep red mixture was stirred for 2 hours at −30° C. The reaction mixture was filtered and the filter cake was rinsed with cold pentane. The combined filtrate was pumped off to give a somewhat sticky red material, which was triturated with 20 mL of pentane, cooled to −30° C., filtered and dried under vacuum. The triturated solid showed impure product by $^1$H NMR. Trituration with pentane was repeated two more times affording the pure desired product in 30% yield.

$^1$H NMR (400 MHz, C$_6$D6) δ 7.08 (m, 8H), 6.95 (m, 4H), 6.61 (m, 8H), 2.81 (s, 8H).

Reactor Setup

A high-pressure Parr reactor was used for these examples. Key reactor specifications included:
    600 mL Parr reactor
    Siemens PCS-7 control system
    Solvent loading cylinder (600 mL)
    Catalyst loading cylinder (60 mL)
    Monomer-specific mass flow control
    Pressure control
    Internal cooling coil
    Glycol chiller/band heater control (−20 to 200° C.)
    Glass kettle dump tank 2000 psig rupture disc and knockout pot Due to the fact that the internal cooling coil and the agitator occupied some of the total reactor volume, the polymerization solutions were limited to 250 mL and the hot wash between runs to 400 mL. In an effort to keep the solvents used for runs and washes dry and free of oxygen, each solvent was loaded into a cylinder inside of a nitrogen-purged glovebox and added to the reactor from the cylinder using pressurized nitrogen.

Polymer Synthesis Using Procatalyst 2—General Procedure

Synthesis of the iPB Block

The polymerization was carried out in a 600 milliliter (mL) Parr reactor controlled by a Siemens process control system and equipped with an internal cooling coil. Chlorobenzene (200 mL) was added to the reactor from a solvent cylinder pressurized with nitrogen. The agitator was turned on at 700 revolutions per minute (rpm) and the reactor was cooled to about −7° C. using a chiller. The 1-butene monomer was added at 1800 milligrams per minute (mg/min). The FAB activator was dissolved in 10 mL of chlorobenzene was added to the reactor via a small bomb pressurized with nitrogen. A fresh solution of ligand 1 mixed with $TiBn_4$ in 20 mL of chlorobenzene was added to the reactor via the same small bomb pressurized with nitrogen. The bomb was flushed with 20 mL chlorobenzene. The reactor contents were agitated for a specified length of time to produce the iPB block.

Synthesis of the Ethylene/1-Butene (EB) Block

In order to achieve chain extension via the addition of an EB block, ethylene was added to the reactor either by quickly pressurizing the reactor with ethylene to a set pressure and then allowing ethylene to flow at 0.2 grams per minute (g/min) to maintain pressure. The vent valve was controlled to open in the event of a pressure rise above the setpoint to maintain the target pressure. After completing the synthesis of the EB block with a specific block length, the ethylene flow was stopped and the reactor was quickly purged with nitrogen to remove residual ethylene from the solution. This was done by venting the reactor quickly, then pressurizing it to about 50 pounds per square inch (psig) (344.74 kilopascals (kPa)) with nitrogen through a tube reaching down to the bottom of the reactor and venting quickly again.

Synthesis of the Third Block (iPB)

After the ethylene flow was shut off and the solution was quickly purged with nitrogen, generally extra 1-butene was added to make up for the amount consumed during the polymerization and lost during the nitrogen purge. Allowing the reaction to proceed for a specified length of time facilitated chain extension via the growth of the third block (iPB).

Sampling the Reactor for GPC Analysis

In order to accelerate sample turnaround, we developed the following method of preparing samples for gel permeation chromatography (GPC) analysis: each polymerization reaction mixture was sampled directly into 30 mL of 1,2,4-trichlorobenzene (TCB) containing 200 parts per million (ppm) of the butylated hydroxytoluene (BHT) inhibitor. Lower sample volume was required at higher conversion due to higher polymer concentration. Next, in order to remove the orange color caused by catalyst decomposition products, the TCB solution was mixed with a small amount of silica gel (about 100-200 mg) and heated to 90° C. for 30 minutes while stirring. Stirring was then stopped allowing the silica gel to settle. The resulting colorless liquid phase was decanted into a syringe equipped with a 1 micron polytetrafluoroethylene (PTFE) syringe filter and quickly filtered into a vial. The solution obtained this way was suitable for GPC analysis without further filtration, thereby dramatically accelerating the GPC turnaround time. Samples did require heating before transferring the solutions into GPC vials in order to ensure that the entire polymer was in the solution phase.

Isolation of the Final Polymer Product

The final polymer product was isolated by draining the reactor into 600 mL of methanol. The polymer precipitate was filtered and dried at 130° C. under vacuum overnight. Each polymerization was followed by a hot wash using dry, degassed toluene (400 mL) at 170° C. under about 50 psig (344.74 kPa) pressure for a minimum of 4 hours. Inventive Examples 1-3

All three Inventive Examples (IE) were iPB-EB-iPB triblock copolymers prepared according to the general method described above. All samples were subjected to four weeks of aging at 25° C. prior to mechanical testing. Specific run details and polymer characterization data are reported in Table 2.

TABLE 2

Run Details and Polymer Data of IE 1-3

| Ex. | Polymer type | 1-Butene (g) | Segment $C_2H_4$ (psig) | Polymer run time (min) | Yield (g) | GPC (triple detector, absolute MW) | | | $^{13}$C NMR wt % | wt % | DSC | | |
|---|---|---|---|---|---|---|---|---|---|---|---|---|---|
| | | | | | | $M_w$ | $M_n$ | PDI | iPB | B in EB | L (° C.) | $T_m$ (° C.) | $\Delta H_m$ (J/g) |
| 1 | iPB | 20 | | 30 m | | 17,864 | 12,393 | 1.44 | | | | | |
| | diblock | | 30 | 30 m | | 86,911 | 55,323 | 1.57 | | | | | |
| | triblock | +10 | | 30 m | 5.47 | 113,914 | 76,643 | 1.49 | 39.2 | 58.2 | −59.9 | 80.1 | 13.2 |
| 2 | iPB | 30 | | 30 m | | 27,402 | 18,574 | 1.48 | | | | | |
| | diblock | | 30 | 90 m | | 202,557 | 128,711 | 1.57 | | | | | |
| | triblock | +10 | | 30 m | 12.22 | 234,956 | 152,029 | 1.55 | 34.3 | 61.0 | −54.2 | 83.1 | 10.8 |
| 3 | iPB | 20 | | 70 m | | 41,183 | 28,532 | 1.44 | | | | | |
| | diblock | | 70 | 25 m | | 158,488 | 101,965 | 1.55 | | | | | |
| | triblock | +5 | | 70 m | 11.61 | 215,564 | 120,420 | 1.79 | 34.7 | 47.1 | −61.7 | 94.1 | 3.6 |

$TiBn_4$: 120 micromoles (μmol).

Ligand 1: $TiBn_4$:FAB = 1.2:1:1.2 (mole ratio).

Reactor temperature: −7° C.

Comparative Examples (CE) 1-3

Synthesis Random Poly(Ethylene-Co-1-Butene) Copolymer (EB) Using Procatalyst 2

Chlorobenzene (200 mL) was added to the reactor from a solvent cylinder pressurized with nitrogen. The agitator was turned on at 700 rpm and the reactor was cooled to about −7° C. using a chiller. The 1-butene monomer was added at 1800 mg/min. The FAB activator was dissolved in 10 mL of chlorobenzene was added to the reactor via a small bomb pressurized with nitrogen. A fresh solution of ligand 1 mixed with $TiBn_4$ in 20 mL of chlorobenzene was added to the reactor via the same small bomb pressurized with nitrogen. The bomb was flushed with 20 mL chlorobenzene. The reactor was quickly pressurized with ethylene to 50 psig (344.74 kPa). An ethylene flow was established at 0.2 g/min to maintain pressure. The vent valve was controlled to open in the event of a pressure rise above the setpoint to maintain the target pressure. The reactor contents were agitated for 90 minutes to produce the EB sample. Specific run details and polymer characterization data are reported in Table 3.

Comparative Example 1 (CE-1) (20/80 w/w Blend of iPB/EB)

A 20/80 blend of an iPB homopolymer (20 kg/mol, 2.38 PDI, 96% [mmmm], 85% [4 m]) and random poly(ethylene-co-1-butene) (EB) copolymer (189 kg/mol, 1.56 PDI, 57 wt % 1-butene) was prepared by dissolving the two polymers in hot toluene, precipitating in methanol, and drying under vacuum. The blend has a total 1-butene composition of 65 wt % ($^{13}C$ NMR). Tensile specimens were prepared by compression molding and samples measured according to ASTM D638 (Type V) at an extension rate of 2"/min after 28 days of aging at room temperature. Hysteresis and tensile set were recorded after elongating the sample to 300%. The data is reported in Table 5.

Comparative Example 2 (CE-2) (25/75 w/w Blend of iPB/EB)

A 25/75 blend of an iPB homopolymer (20 kg/mol, 2.38 PDI, 96% [mmmm], 85% [4 m]) and random poly(ethylene-co-1-butene) (EB) copolymer (189 kg/mol, 1.56 PDI, 57 wt % 1-butene) was prepared by dissolving the two polymers in hot toluene, precipitating in methanol, and drying under vacuum. The blend has a total 1-butene composition of 67 wt % ($^{13}C$ NMR). Tensile specimens were prepared by compression molding and samples measured according to ASTM D638 (Type V) at an extension rate of 2"/min after 28 days of aging at room temperature. Hysteresis and tensile set were recorded after elongating the sample to 300%. The data is reported in Table 5.

Comparative Example 3 (CE-3) (40/60 w/w Blend of iPB/EB)

A 40/60 blend of an iPB homopolymer (20 kg/mol, 2.38 PDI, 96% [mmmm], 85% [4 m]) and random poly(ethylene-co-

TABLE 3

| | | | | | | | | | | |
|---|---|---|---|---|---|---|---|---|---|---|
| Run Details and Polymer Data of EB Copolymer | | | | | | | | | | |
| | | | Run | Polymer | GPC | | | $^{13}C$ | DSC | |
| Polymer | 1-Butene | $C_2H_4$ | time | Yield | (triple detector, absolute MW) | | | NMR | $T_g$ | $T_m$ | $\Delta H_m$ |
| type | (g) | (psig) | (min) | (g) | $M_w$ | $M_n$ | PDI | wt % B | (° C.) | (° C.) | (J/g) |
| EB | 30 | 50 | 90 | 16.60 | 295,235 | 188,815 | 1.56 | 57 | −62.1 | ND | ND |

$TiBn_4$: 120 μmol.
Ligand 1: $TiBn_4$:FAB = 1.2:1:1.2 (mole ratio).
Reactor temperature: −7° C.
ND = none detected.

Synthesis of iPB Homopolymer Using Procatalyst 3

The polymerization was carried out in a 600 mL Parr reactor controlled by a Siemens process control system and equipped with an internal cooling coil. A solution of the trityl tetrakis(pentafluorophenyl) borate activator in 220 mL of chlorobenzene was added to the reactor from a solvent cylinder pressurized with nitrogen. The agitator was turned on at 700 rpm and the reactor was cooled to −6° C. using a chiller. The 1-butene monomer was added at 1800 mg/min. A solution of Procatalyst 3 in 15 mL of chlorobenzene was added to the reactor via a small bomb pressurized with nitrogen. The bomb was flushed with 15 mL chlorobenzene. The reactor contents were agitated for 25 hours to produce the iPB homopolymer. Specific run details and polymer characterization data are reported in Table 4.

TABLE 4

| | | | | | | | | | | |
|---|---|---|---|---|---|---|---|---|---|---|
| Run Details and Polymer Data of iPB Homopolymer | | | | | | | | | | |
| | Run | Polymer | GPC | | | $^{13}C$ NMR | | DSC | | |
| Polymer | 1-Butene | time | Yield | (triple detector, absolute MW) | | | % | % | $T_g$ | $T_m$ | $\Delta H_m$ |
| type | (g) | (h) | (g) | $M_w$ | $M_n$ | PDI | mmmm | mm | (° C.) | (° C.) | (J/g) |
| iPB | 80 | 25 | 19 | 48,163 | 20,203 | 2.38 | 85 | 96 | −21.4 | 113.4 | 87.5 |

Procatalyst 3: 453 μmol.
Activator: Procatalyst 3 = 1.08 (mole ratio).
Reactor pressurized to 50 psig (344.74 kPa) with $N_2$.
Reactor temperature: −6° C.

1-butene) (EB) copolymer (189 kg/mol, 1.56 PDI, 57 wt % 1-butene) was prepared by dissolving the two polymers in hot toluene, precipitating in methanol, and drying under vacuum. The blend has a total 1-butene composition of 74 wt % ($^{13}$C NMR). Tensile specimens were prepared by compression molding and samples measured according to ASTM D638 (Type V) at an extension rate of 2"/min after 28 days of aging at room temperature. Hysteresis and tensile set were recorded after elongating the sample to 300%. The data is reported in Table 5.

TABLE 5

Tensile and Compressive Strength Performance of IE and CE Samples

| Example | Ultimate Tensile Strength (psi) | Elongation at Break (%) | Young's Modulus (psi) | TS @100% (psi) | TS @300% (psi) | Hysteresis (%) | Tensile Set (%) |
|---|---|---|---|---|---|---|---|
| 1 | 1211 | 3700 | 2876 | 209 | 221 | 57 | 54 |
| 2 | 999 | 4130 | 605 | 133 | 158 | 40 | 49 |
| 3 | 1580 | 2585 | 624 | 190 | 239 | 47 | 48 |
| Comp. 1 | 122 | 98 | 581 | 30 | — | — | — |
| Comp. 2 | 122 | 87 | 618 | — | — | — | — |
| Comp. 3 | 190 | 45 | 1429 | — | — | — | — |

"—" indicates no data available as sample failed to reach sufficient strain.

Discussion of Results

Table 5 shows the mechanical testing data for Examples 1-3 and Comparative Examples 1-3. The iPB-EB-iPB triblock copolymers (Examples 1-3) showed significantly higher elongation than the blends of homopolymers (Comparative Examples 1-3) indicating that they are much more extensible than the blends. This elasticity results in the hysteresis and tensile set values shown in Table 5, which represent good elastic recovery. The Comparative Examples were too brittle and failed during elastic hysteresis testing.

Without being bound by this theory, it is believed that the elastic results of the inventive examples are derived, in part, from the low creep properties of the iPB blocks. As one of ordinary skill in the art would know, iPB can have good creep resistance as compared to other semi-crystalline polyolefins, but the good creep resistance requires high isotacticity.

What is claimed is:

1. A semi-crystalline, thermoplastic polyolefin block copolymer comprising:
   (A) a first polyolefin A block comprising isotactic poly(1-butene) (iPB);
   (B) a polyolefin B block comprising 1-butene and one or more monomers selected from the group consisting of ethylene, a second alpha-olefin, and combinations thereof; and
   (C) a second polyolefin A block comprising isotactic poly(1-butene) (iPB);
   the A and B blocks bonded to one another to form the polymer in which the first and second polyolefin A blocks are joined to and separated by the polyolefin B block.

2. A semi-crystalline, thermoplastic polyolefin block copolymer comprising:
   (A) a first polyolefin B block comprising 1-butene and one or more monomers selected from the group consisting of ethylene, a second alpha-olefin, and combinations thereof;
   (B) a polyolefin A block comprising isotactic poly(1-butene) (iPB); and
   (C) a second polyolefin B block comprising 1-butene and one or more monomers selected from the group consisting of ethylene, a second alpha-olefin, and combinations thereof;
   the B and A blocks bonded to one another to form the polymer in which the first and second polyolefin B blocks are joined to and separated by the polyolefin A block.

3. The semi-crystalline, thermoplastic polyolefin polymer of claim 1 in which the polyolefin B block has a glass transition temperature ($T_g$) of less than 20° C.

4. The semi-crystalline, thermoplastic polyolefin polymer of claim 1 in which the polyolefin B block comprises ethylene and 1-butene.

5. A composition comprising the semi-crystalline, thermoplastic polyolefin polymer of claim 1.

6. An article comprising the composition of claim 5.

7. The article of claim 6 in the form of an injected molded part, or a cast or blown film.

8. A process for making a semi-crystalline, thermoplastic polyolefin ABA block copolymer, the process comprising the steps of:
   (A) feeding 1-butene to a high pressure reactor under polymerization conditions to produce a first A block of isotactic poly(1-butene) (iPB);
   (B) adding, in the presence of 1-butene, a monomer selected from the group consisting of ethylene, a second alpha-olefin, and combinations thereof to the reactor under copolymerization conditions under copolymerization conditions to form a B block of a 1-butene/ethylene copolymer, a 1-butene/alpha-olefin copolymer, or a 1-butene/ethylene/alpha-olefin terpolymer which is attached to the first A block to form an AB block copolymer; and
   (C) stopping the addition of ethylene and/or the second alpha-olefin, and continue feeding 1-butene to the reactor under polymerization conditions to form a second A block of iPB which is attached to the B block to form the ABA block copolymer.

9. A process for making the semi-crystalline, thermoplastic polyolefin BAB block copolymer, the process comprising the steps of:
   (A) feeding 1-butene and a monomer selected from the group consisting of ethylene, a second alpha-olefin, and combinations thereof to a reactor under copolymerization conditions to form a first B block of 1-butene/ethylene copolymer, a 1-butene/alpha-olefin copolymer, or a 1-butene/ethylene/alpha-olefin terpolymer;
   (B) stopping the addition of ethylene and the second alpha-olefin, and continue feeding 1-butene to the reactor under polymerization conditions to form an A block of isotactic poly(1-butene) (iPB) which is attached to the A block to form a BA block copolymer; and (C) restarting, in the presence of 1-butene, the addition of a monomer selected from the group consisting of ethylene, a second alpha-olefin, and combinations thereof to the reactor under copolymerization conditions to form a second B block of a 1-butene/ethylene, a 1-butene/alpha-olefin copolymer, or a 1-butene/ethylene/alpha-olefin terpolymer which is attached to the A block to form the BAB block copolymer.

10. The process of claim 8 in which the polyolefin B block has a glass transition temperature ($T_g$) of less than 20° C.

11. The process of claim 8 in which the polyolefin B block comprises ethylene and 1-butene.

12. The semi-crystalline, thermoplastic polyolefin polymer of claim 2 in which the polyolefin B block has a glass transition temperature ($T_g$) of less than 20° C.

13. The semi-crystalline, thermoplastic polyolefin polymer of claim 2 in which the polyolefin B block comprises ethylene and 1-butene.

14. A composition comprising the semi-crystalline, thermoplastic polyolefin polymer of claim 2.

15. The process of claim 9 in which the polyolefin B block has a glass transition temperature ($T_g$) of less than 20° C.

16. The process of claim 9 in which the polyolefin B block comprises ethylene and 1-butene.

* * * * *